US011106957B1

(12) United States Patent
Gupta et al.

(10) Patent No.: US 11,106,957 B1
(45) Date of Patent: Aug. 31, 2021

(54) SYSTEM AND METHOD TO TRACK PIPES USING TAGS BASED ON HIGH REDUNDANCY CODES

(71) Applicant: Hitachi, Ltd., Tokyo (JP)

(72) Inventors: Manish Gupta, Sunnyvale, CA (US); Ravigopal Vennelakanti, San Jose, CA (US); Rahul Vishwakarma, Sunnyvale, CA (US); Akira Maeki, Cupertino, CA (US); Yuki Watanabe, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/825,465

(22) Filed: Mar. 20, 2020

(51) Int. Cl.
*G06K 19/06* (2006.01)
(52) U.S. Cl.
CPC ... *G06K 19/0614* (2013.01); *G06K 19/06037* (2013.01); *G06K 19/06075* (2013.01)
(58) Field of Classification Search
CPC ......... G06K 19/0614; G06K 19/06075; G06K 19/06037; G06K 17/00; G06K 19/06056; G06K 7/10722; G06K 7/1417
See application file for complete search history.

(56) References Cited

U.S. PATENT DOCUMENTS

| | | | |
|---|---|---|---|
| 3,935,432 A | 1/1976 | Maynard | |
| 7,623,274 B1 * | 11/2009 | Lefevere | H04N 1/00002 358/406 |
| 7,936,901 B2 | 5/2011 | Jancke | |
| 2010/0155479 A1 * | 6/2010 | Ming | G06K 17/00 235/462.1 |
| 2016/0314387 A1 * | 10/2016 | Guenter | G06K 19/06056 |
| 2017/0244869 A1 * | 8/2017 | Uroz Soria | H04N 1/00023 |
| 2018/0122061 A1 * | 5/2018 | Chatterjee | H04N 1/6086 |
| 2018/0158212 A1 * | 6/2018 | Ghazizadeh | G06K 7/10722 |
| 2018/0336703 A1 * | 11/2018 | Ghazizadeh | A61B 5/6898 |

\* cited by examiner

*Primary Examiner* — Thien M Le
(74) *Attorney, Agent, or Firm* — Procopio, Cory, Hargreaves & Savitch LLP

(57) ABSTRACT

Example implementations described herein are directed to a tag using a color/pattern coding scheme for better use in industrial settings which may involve curved objects such as pipes. The tag can include one or more anchors indicative of an orientation of the tag; a calibration pattern mapping each of a plurality of colors/patterns to one or more values; and encoded information provided on the tag in one or more of the plurality of colors/patterns. The tag may be printed directly on the object to ensure longevity and readability, or attached as a sticker or printed label depending on the desired implementation.

13 Claims, 15 Drawing Sheets

Serial Number (S): 8 4 2 9 5 0 4 6 2 9 4

S Mod 9 = 8

Checksum Digit = 9-8 =1

Serial number (with checksum) to be put on the tag: 8 4 2 9 5 0 4 6 2 9 4 1

If the reader reads (R): 8 4 2 4 5 0 4 6 2 9 4 1, then there has been an error as R Mod 9 = 4 (and not 9.

FIG. 10

SYSTEM AND METHOD TO TRACK PIPES USING TAGS BASED ON HIGH REDUNDANCY CODES

BACKGROUND

Field

The present disclosure is generally related to inventory systems, and more specifically, for systems and methods to track pipes using tags based on high redundancy codes.

Related Art

Oil Country Tubular Goods (OCTG) are a family of rolled steel products that are used to drill, setup and operate an oil well. These include drill pipes, casing, tubing and other accessories. In the United States, OCTG demand is well over five million metric tons per annum. Large OCTG distributors buy, stock and ship millions of pipes each year. With massive turnover of inventory, tracking can become important.

OCTG pipes are currently tracked at the lot-level (i.e. batch level). Since OCTG pipes come in various steel-grades, diameters and threading-types, wherein each pipe can be of a different length within a range, each pipe is different. As aggregation and disaggregation is frequent during distribution, tracking only at lot-level can be inadequate. However, tracking at the individual pipe-level (also known as joint-level) is largely non-existent. Increasingly, various stakeholders in the OCTG value-chain are recognizing the need for pipe-level tracking as it provides better supply-chain visibility, auditability of materials and processes, and leads to faster, more accurate invoicing.

Many attempts have been made over the years to apply standard tracking technologies, including one dimensional (1D) barcodes, two dimensional (2D) barcodes (e.g. Datamatrix, QuickResponse (QR)-Codes), Radio Frequency Identifiers (RFID), and so on to track individual OCTG pipes. None of these attempts have been successful due to the unique challenges posed by the nature of OCTG pipes, harsh storage environments, demanding usage conditions, and complicated supply-chain structures.

In the related art, there are two types of implementations: (1) pipe-level tracking as it is being attempted for the OCTG use-case, and (2) color-based tracking technologies in general. However, such implementations have various disadvantages and difficulties in implementation for the OCTG use-case.

In the related art implementations for OCTG, batch information is stenciled on the pipe. Various OCTG manufacturers have tried to extend the same approach by adding individual serial number to the stencils. While the approach constitutes a simple extension to an existing practice and is easy to implement, it has major downsides including: (a) stencils are hard to make machine-readable and require human transcription, (b) they are not suitable for passive reading from a distance, which is a key requirement from a fast-invoicing perspective, (c) stencils traditionally do not last for long and are prone to fading and degeneration with time and corrosion of pipe, (d) they do not include any kind of error-correction or error-detection ability.

In related art implementations for OCTG manufacturers, there can be RFID and 2D barcode labels attached to the end-caps and thread protectors. Such solutions have multiple issues, including: a) The RFID tags or 2D barcode stickers cannot be attached to pipe itself as any addition to the pipe must be removed before the pipe is put downhole (i.e. installed in the well). Hence, the tags are attached to endcaps and threat protectors, which are prone to breakage and are replaced frequently. Re-associating a replacement end-cap or protector that has a new tag with the pipe is error-prone and process-intensive. b) Further, during Quality Control (QC) checks and pipe preparation steps, the caps of multiple pipes are removed, put in a pile, and eventually put back on—there is no guarantee that the cap that was removed from a pipe will be put back on the same-pipe. This can potentially corrupt the tracking information. c) 2D barcodes attached to end-caps and thread protectors tend to fade and/or fall off over time. Similar to RFID tags, they also suffer from the issue of corruption of tracking information due to caps getting mixed-up.

In other related art implementations, OCTG pipe manufacturers have tried to stencil 2D barcodes (such as Datamatrix or QR code) directly onto the pipes. As stickers cannot be attached to the pipes, the 2D barcodes must be directly printed onto the pipes. Such solutions also have issues, including: a) 2D barcodes have finely arranged features along two dimensions. Such 2D features are hard to print precisely directly on to the pipes due to the ovality of the pipes. Ovality, or "out-of-roundness" is a common issue with pipes, which results in the cross-section of the pipe not being a perfect cylinder, but more elliptical. Minor ovality is often enough to misalign the 2D barcode features. b) 2D barcodes must be completely visible to a camera in its entirety for it to be read. If it is printed in a large size on a small diameter pipe, the full barcode is not visible in the camera view. This causes issues when reading the barcode. c) Issues outlined in points a) and b) above, necessitate the 2D barcode to be printed in a small size on the pipe. A small size in turn makes the barcode readable from proximity only and distant reading even from a few feet away becomes challenging. Further, a small code with small features can be rendered unreadable with minor corrosion or scratch.

Across industries, linear barcodes, 2D barcodes and RFID are the most prevalent tracking technologies. However, as noted above, such related art implementations are ineffective for tracking OCTG pipes. Various attempts have been made to develop color-based tracking tags. Most of these attempts either failed or work for a very narrow set of use-cases and are not suitable for the OCTG use-case. Prominent color-based tags include High Capacity Color Barcode (HCCB) which leveraged clusters of colored triangles to encode data, Automatic Car Identification (ACI) which is a system of tracking rail-cars and rolling stock based on horizontal colored and patterned bars, Chameleon Code, which uses a matrix of squares of 4-colors as a tag is primarily aimed at indoor application, and Color Construct Code, which used a dense matrix of multiple colors in a square array.

However, such color-tag implementations tend to be in the form of 2D barcodes, which are difficult to print and read correctly on cylindrical surfaces such as OCTG pipes due to ovality issues, and encounter the same problems as QR Codes and Datamatrix codes. Thick pigmented-ink based printing systems, which are used to print long lasting tags on OCTG pipes, are difficult to tune to print fine-grained features, such as triangles required by HCCB or small square needed by Chameleon Codes, or Color Construct Codes. Codes with fine-grained features are more susceptible to weathering (as experienced by OCTG pipes) as little corrosion and fading can render the tag unreadable. Further, Colorcode is primarily aimed at advertisement space and encoding standard information and batch references (such as product Uniform Resource Locators (URLs)) as opposed to serial numbers for individual items. Further, in the ACI implementation, the choice of colors and checkerboard pattern is ineffective for OCTG pipes, and lack of error-correction and error-detection renders even slightly damaged tags useless.

SUMMARY

To overcome these issues, example implementations described herein utilize a novel technique based on pattern or color-coded bars and characters, and replicated symbols to mark and track each pipe individually. Example implementations involve a new pattern/color-coded bar- and character-based tracking technology that facilitates tracking of OCTG pipes at an individual pipe-level.

Aspects of the present disclosure involve a method, which can include locating, from an image of an object, a tag on the object, the tag including one or more anchors indicative of an orientation of the tag, a calibration pattern mapping each of a plurality of colors to one or more values, and encoded information provided on the tag in one or more of the plurality of colors; transforming the tag according to the orientation indicated by the one or more anchors; determining a color palette to information mapping from the calibration pattern; and decoding the encoded information from the one or more of the plurality of colors based on the color palette to information mapping.

Aspects of the present disclosure involve a non-transitory computer readable medium, storing information for executing a process, the instructions which can include locating, from an image of an object, a tag on the object, the tag including one or more anchors indicative of an orientation of the tag, a calibration pattern mapping each of a plurality of colors to one or more values, and encoded information provided on the tag in one or more of the plurality of colors; transforming the tag according to the orientation indicated by the one or more anchors; determining a color palette to information mapping from the calibration pattern; and decoding the encoded information from the one or more of the plurality of colors based on the color palette to information mapping.

Aspects of the present disclosure involve a system, which can include means for locating, from an image of an object, a tag on the object, the tag including one or more anchors indicative of an orientation of the tag, a calibration pattern mapping each of a plurality of colors to one or more values, and encoded information provided on the tag in one or more of the plurality of colors; means for transforming the tag according to the orientation indicated by the one or more anchors; means for determining a color palette to information mapping from the calibration pattern; and means for decoding the encoded information from the one or more of the plurality of colors based on the color palette to information mapping.

Aspects of the present disclosure involve an apparatus, which can include a processor, configured to: locate, from an image of an object, a tag on the object, the tag including one or more anchors indicative of an orientation of the tag, a calibration pattern mapping each of a plurality of colors to one or more values, and encoded information provided on the tag in one or more of the plurality of colors; transform the tag according to the orientation indicated by the one or more anchors; determine a color palette to information mapping from the calibration pattern; and decode the encoded information from the one or more of the plurality of colors based on the color palette to information mapping.

Aspects of the present disclosure involve a tag, involving one or more anchors indicative of an orientation of the tag; a calibration pattern mapping each of a plurality of colors to one or more values; and encoded information provided on the tag in one or more of the plurality of colors.

Aspects of the present disclosure involve a method for providing a tag, involving printing a tag on a surface of a curved object, the tag comprising one or more anchors indicative of an orientation of the tag, a calibration pattern mapping each of a plurality of colors to one or more values; and encoded information provided on the tag in one or more of the plurality of colors.

Aspects of the present disclosure can include a tag for an object, involving one or more anchors indicative of an orientation of the tag; a calibration pattern mapping each of a plurality of colors to one or more values; and encoded information provided on the tag in one or more of the plurality of colors. The tag may be printed onto the object.

Aspects of the present disclosure can include a method for providing a tag, involving printing a tag on a surface of a curved object, the tag including one or more anchors indicative of an orientation of the tag, a calibration pattern mapping each of a plurality of colors to one or more values; and encoded information provided on the tag in one or more of the plurality of colors.

BRIEF DESCRIPTION OF DRAWINGS

FIG. 10 illustrates an example of a checksum scheme, in accordance with an example implementation.

DETAILED DESCRIPTION

Figure 1:
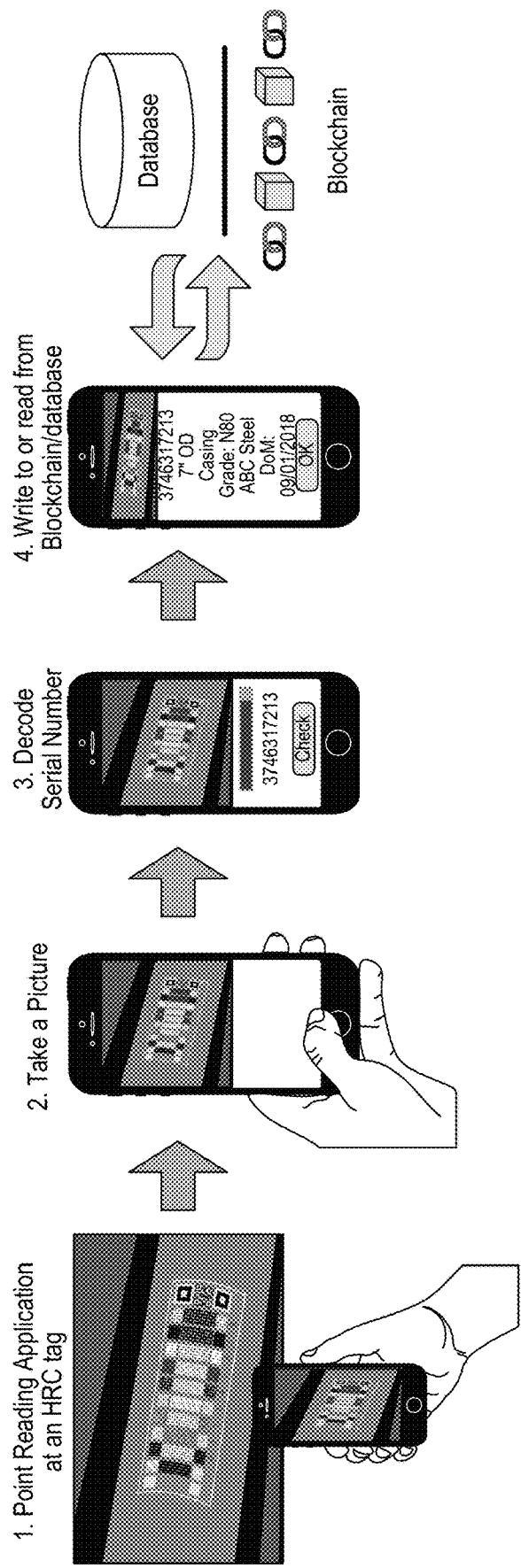
FIG. 1 illustrates an example system implementation involving active reading of HRC tags using hand held devices, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

In the figures as illustrated herein, the pattern fill implementation is utilized as examples for facilitating the example implementations described herein. However, different colors or combinations of colors and pattern fills can be used instead of the pattern fill implementations as illustrated herein, and one of ordinary skill in the art can replace the pattern fill with any desired color or color/pattern combination to facilitate the desired implementation. In example implementations described herein, different colors can be replaced with different fill patterns, and vice versa. Further, the example implementations described herein are illustrated with respect to the implementation of printing the tags directly on the object. However, one of ordinary skill in the art can implement the tags in the form of stickers or labels as well to facilitate the desired implementation for a particular type of object.

Example implementations described herein involve High Redundancy Codes (HRC), to track individual OCTG Pipes using identifiers or serial numbers encoded as pattern-filled or color-coded bars (or characters). The technique is unique as it is human- and machine-readable, provides redundancy at individual digit level, redundancy at identifier or serial-number level, and allows active as well as passive tracking of pipes. Use of pattern-fills or color as an information coding dimension makes the codes compact. The technique allows selection of pattern-fills or colors that are attuned for the specific use-case, environment constraints and deployment. HRC specifies a fundamental structure of the tag yet allows the tag features to be customized for the specific industrial use-case. Instead of being a generalized, fixed tag targeting many applications, the flexible design of the HRC allows it to be customized.

Specifically, example implementations involve a system and method to track and trace OCTG pipes from mill (point of origin) to the well (point of consumption), by tagging it with an HRC tag, an integrated High Redundancy Code (HRC) tag that uses a plurality of pattern filled or color-coded bars, or pattern-filled or color-coded characters to encode information, includes in-built color calibration patterns, includes tag-alignment patterns, has a linear layout to simplify printing on curved surfaces (such as pipes), has redundant features to reduce misreads and tag corruption, and is customizable for the specific industrial use-case.

FIG. 1 illustrates an example system implementation involving active reading of HRC tags using hand held devices, in accordance with an example implementation. As illustrated in FIG. 1, there is a vision-based approach to read HRC tags that facilitates active reading using hand held devices. At first, a point reading application can be utilized to read an HRC tag through a mobile device. Once the device takes a picture of the HRC tag or it is oriented correctly in the camera, the tag can be processed to decode the serial number, which can be used to write to or read from the corresponding database or blockchain depending on the desired implementation.

Figure 2:
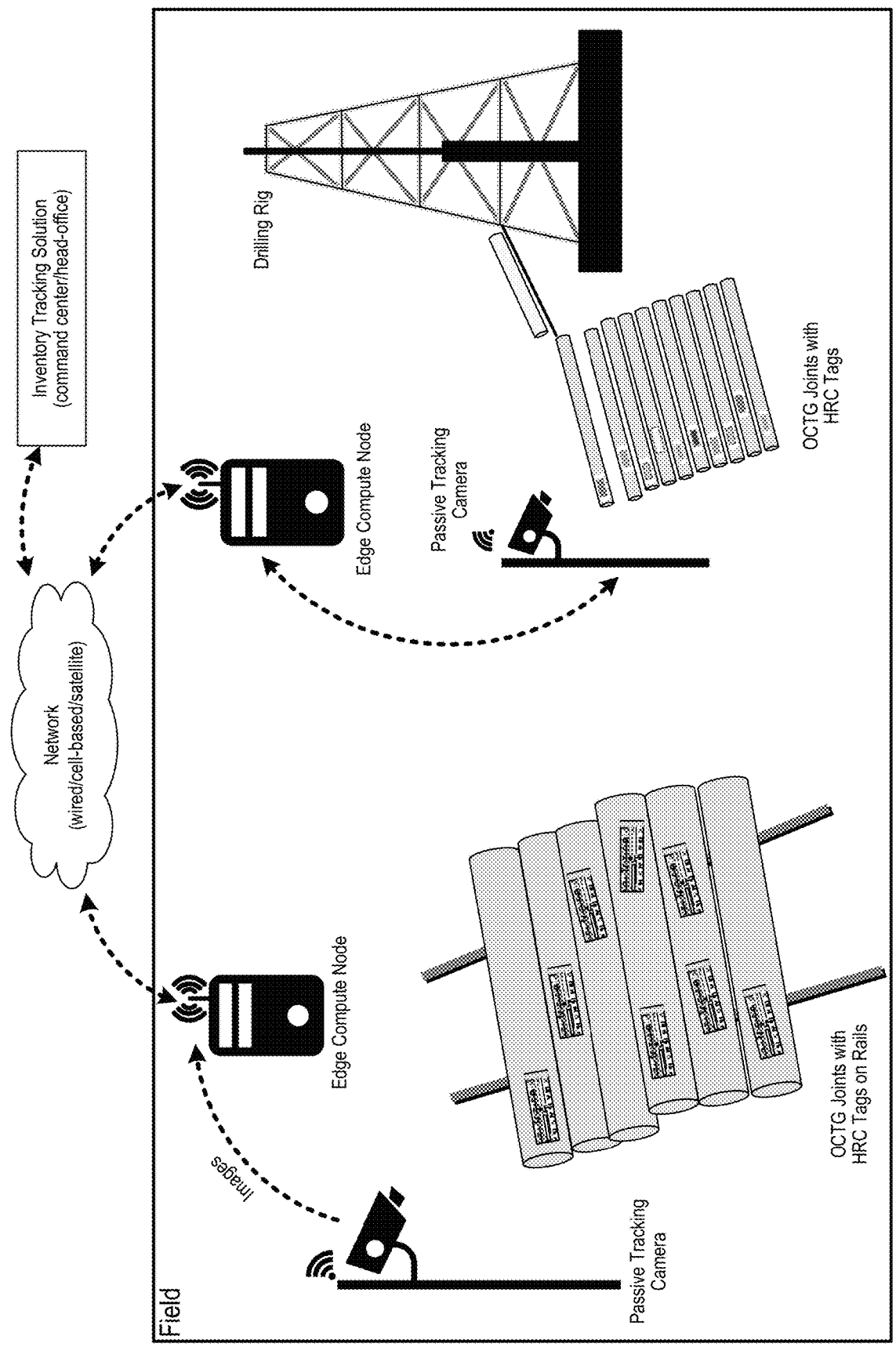
FIG. 2 illustrates examples of passive and distant reading using fixed camera infrastructure in accordance with an example implementation.

FIG. 2 illustrates examples of passive and distant reading using fixed camera infrastructure in accordance with an example implementation. In the example implementation of the system connected to the left edge compute node, there is a passive tracking camera that is connected to an edge compute node which is configured to decode, track and record HRC tags from images received from the passive tracking camera. In such an example implementation, the OCTG joints can include the HRC tags and be rolled over on tracks or channels for inventory tracking. In another example implementation as illustrated in the system connected to the right edge compute node, the passive tracking camera can be configured to track the OCTG joints provided to a drilling rig. Depending on the desired implementation, an approach to improve reading accuracy of tags can be based on look-up tables of active codes. While OCTG pipe tracking is the example implementation shown, the technique can be used for other track and trace use-cases depending on the desired implementation.

In example implementations as shown herein, the HRC leverages color-coded/patterned bars or characters to encode information. In an example implementation, the color palette used for the bars or characters is customizable and can range from a minimum of two colors to any number of colors (different from background), where each color bar or colored character represents a part of information (such as a bit or a digit or a character itself). In example implementations for HRC, color is utilized to increase the encoding density of information as opposed to a linear barcode.

Figure 3:
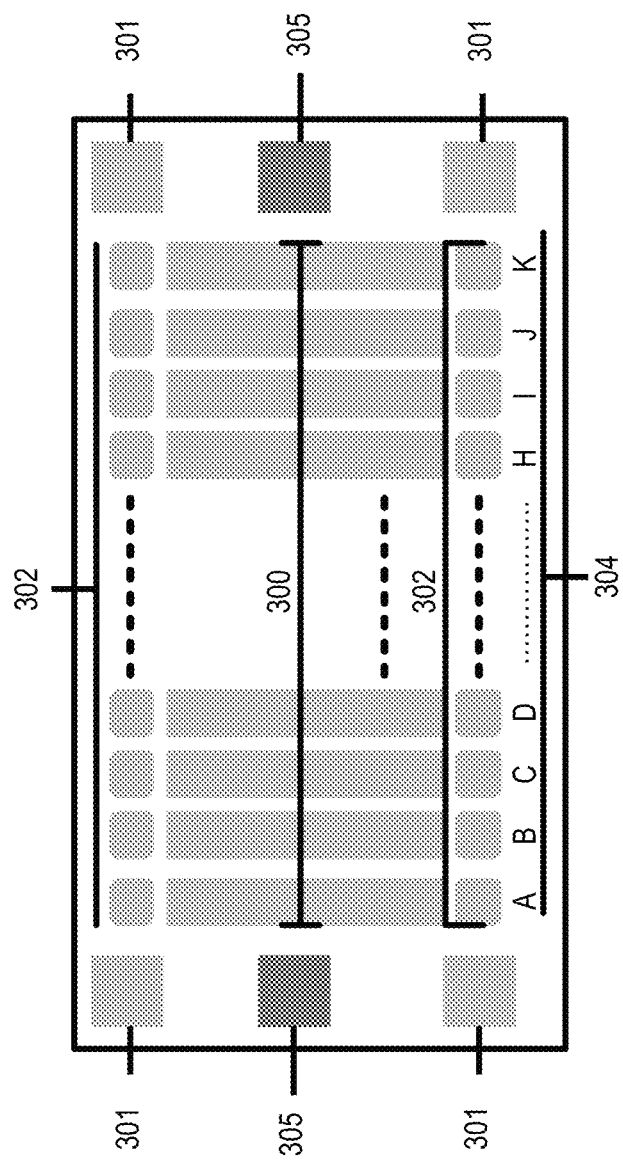
FIG. 3 illustrates an example structure for a tag, in accordance with an example implementation.

FIG. 3 illustrates an example structure for a tag, in accordance with an example implementation. In an example implementation, the tag structure can include color-bands 300 which include a plurality of color-bars of pre-defined width that represent encoded information, anchor pattern(s) 301 including one or more anchor patterns to determine the orientation and reading direction of the tag, and camera calibration patterns 302 to calibrate the reading device dynamically. Depending on the desired implementation, the tag structure can also include plain-text encoded information 304 for representing the encoded information represented by the color-bars, and supplemental code(s) 305 (e.g., such as a barcode or Quick Response (QR) code) that can provide redundancy or contain extra information or even serve as an additional anchor depending on the desired implementation. An example arrangement of such elements is illustrated in FIG. 3, however, it can be rearranged and customized for the specific industrial use case in accordance with the desired implementation.

Figure 4:
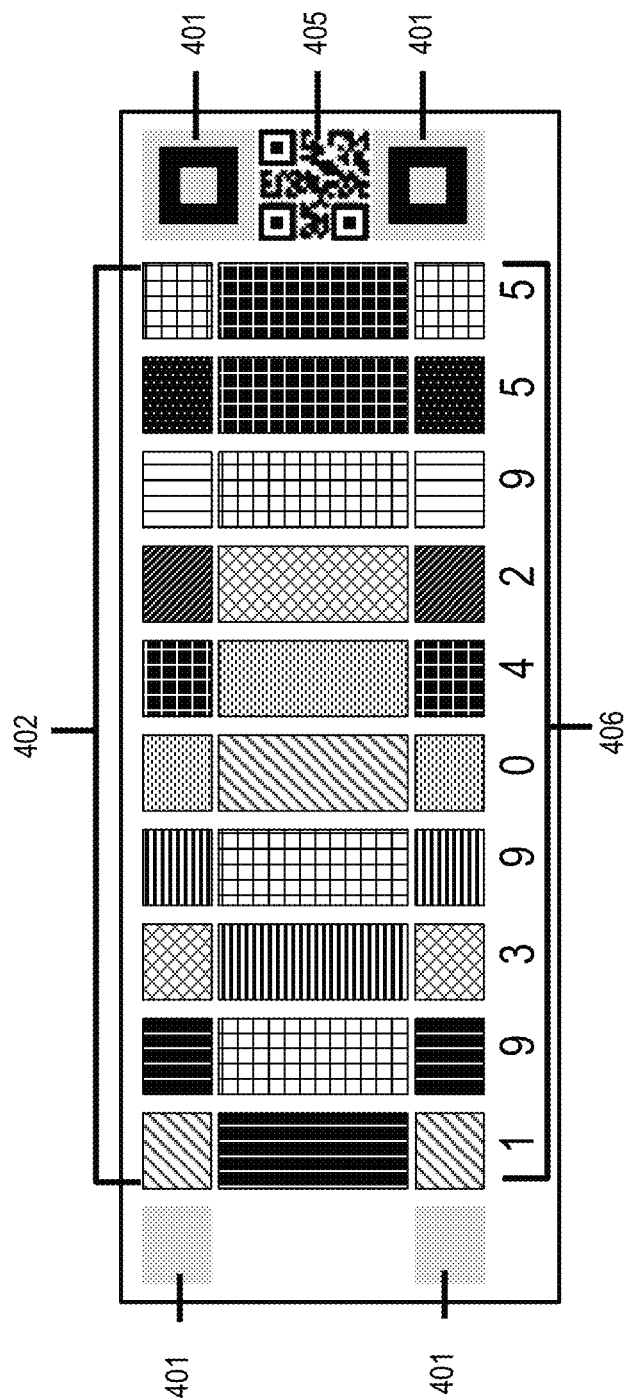
FIG. 4 illustrates an example arrangement of structural elements, in accordance with an example implementation.

FIG. 4 illustrates an example arrangement of structural elements, in accordance with an example implementation. In the example of FIG. 4, there are four anchors 401, two self-calibration patterns 402, a supplementary QR code 405, and plain text encoded information 406.

Figure 5:
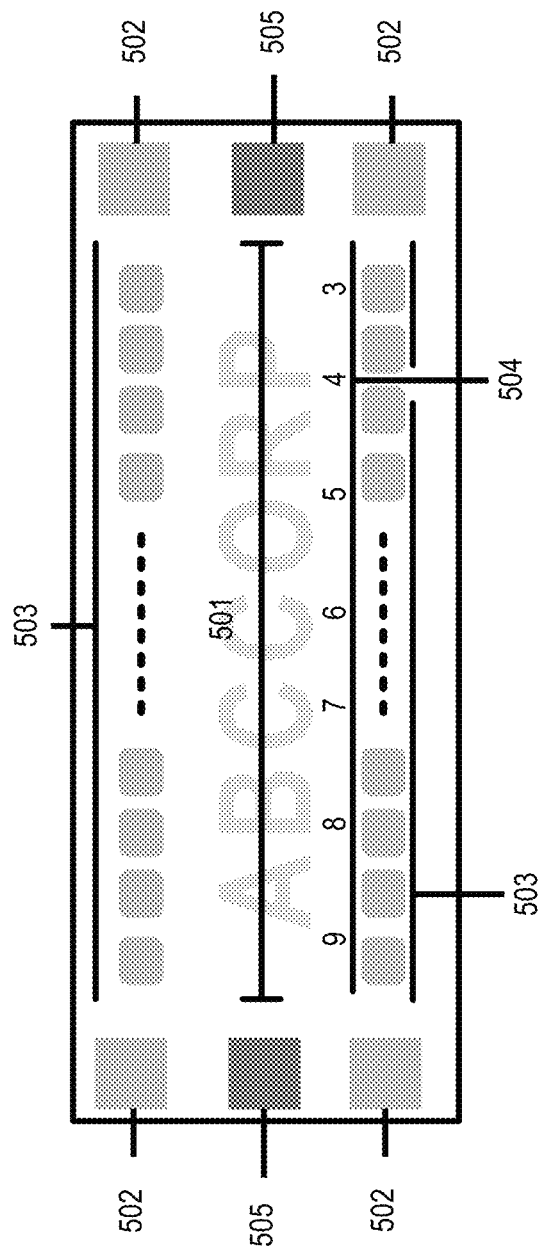
FIG. 5 illustrates another example of a tag structure, in accordance with an example implementation.

FIG. 5 illustrates another example of a tag structure, in accordance with an example implementation. In another example of a tag structure, there is a fixed text string 501 (e.g., to indicate a brand name, product name or model name), wherein each character of the string is pattern-coded or color-coded to represent part of the information such as a serial number, one or more anchors 502 to determine the orientation and reading direction of the tag, and a plurality of calibration patterns 503 to calibrate the reading device dynamically. Depending on the desired implementation, there can also be encoded information 504, which can take the form of plain-text and represented by the patterns/colors of the characters, and supplementary code(s) 505 (such as a QR code or bar codes) that can provide redundancy or contain extra information or even serve as an additional anchor.

For such a tag, while the text string printed on the tag does not need to vary from tag to tag, the patterns/colors assigned to each character of the string will vary based on information encoded on that tag. As an example, if green represents 1 and blue represents 2, then the first character of tag will be printed in green if the serial number being encoded starts with 1. However, if the serial number starts with 2, then the first character will be printed in blue and so on.

In such example implementations, identifiable brand information can be provided within the tag yet allow customization. Further, such example implementations are self-orienting as the orientation of the letters dictates the orientation of the tag and provides the correct reading order. Additionally, error detection can also be facilitated, as any missing character from the fixed test string indicates missing information.

Figure 6A:
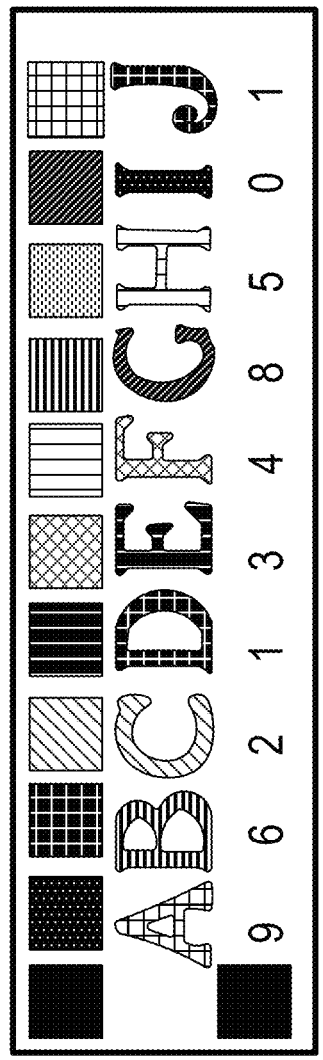
FIGS. 6(a) and 6(b) illustrates example arrangements of structural elements, in accordance with an example implementation.
Figure 6B:
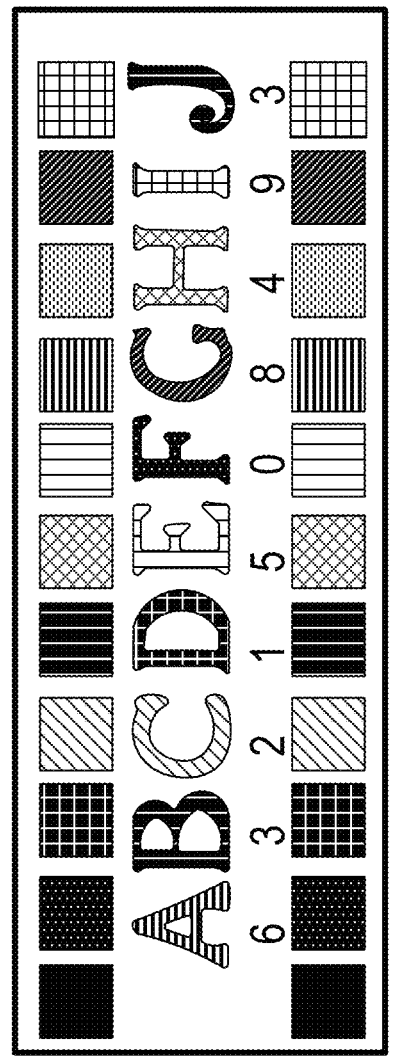

FIGS. 6(*a*) and 6(*b*) illustrate example arrangements of structural elements, in accordance with an example implementation. In the example of FIG. 6(*a*), the tag is in accordance with the implementation of FIG. 5 and involves two anchors and one self-calibration patterns, whereas the example of FIG. 6(*b*) involves two anchors and two self-calibration patterns.

Figure 7:
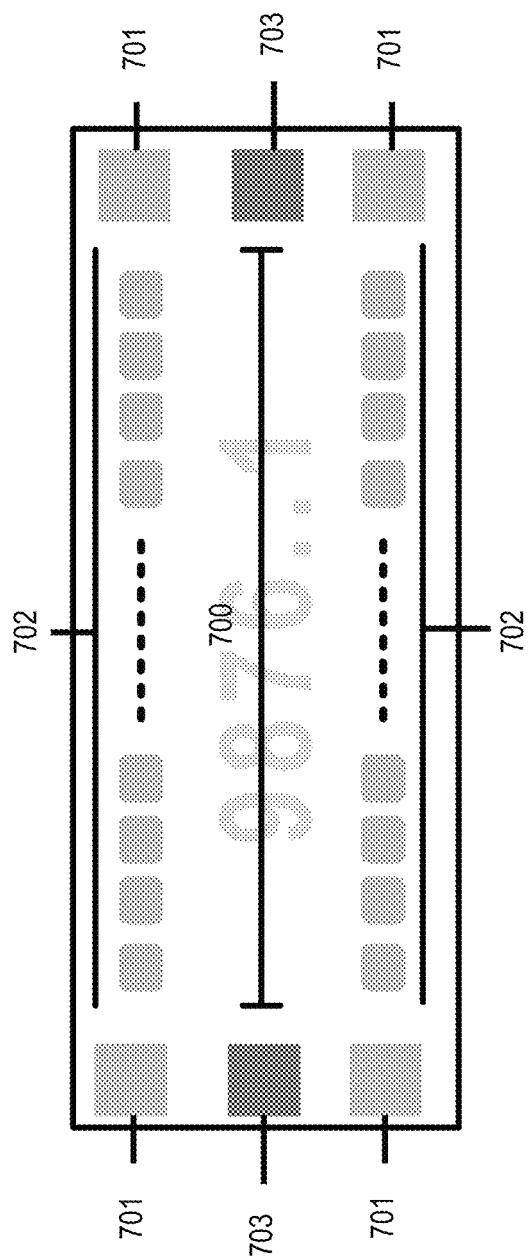
FIG. 7 illustrates another example implementation involving dual-encoded colored character based HRC tags.

FIG. 7 illustrates another example implementation involving dual-encoded colored character or patterned character based HRC tags. In another example implementation, the tag structure can include dual-encoded information 700, wherein the information (such as serial number) is printed directly and each character of the serial number is color coded or patterned to represent information conveyed by that character, anchor pattern(s) 701 to determine orientation and reading direction of the tag, and calibration pattern(s) 702 to calibrate the reading device dynamically. Further, depending on the desired implementation, there can be supplementary code(s) 703 (such as a QR code or barcodes) that can provide redundancy or contain extra information or even serve as an additional anchor.

For such a tag, the characters printed on the tag can vary from tag to tag based on what information (such as serial number) that tag represents. Further, the colors or patterns assigned to each character of the information also encode the information represented by that character. As an example, if green represents 1 and blue represents 2 and if the serial number starts with 1, then first character printed on the tag will be a green 1. However, if the serial number starts with 2, then the first character will be 2 and it will be printed in blue and so on.

Such example implementations can directly provide human-readable information within the tag while having the information encoded by using color or patterns to provide redundancy. Also, the tag is self-orienting as orientation of the characters dictates the orientation of the tag and provides the correct reading order.

Figure 8A:
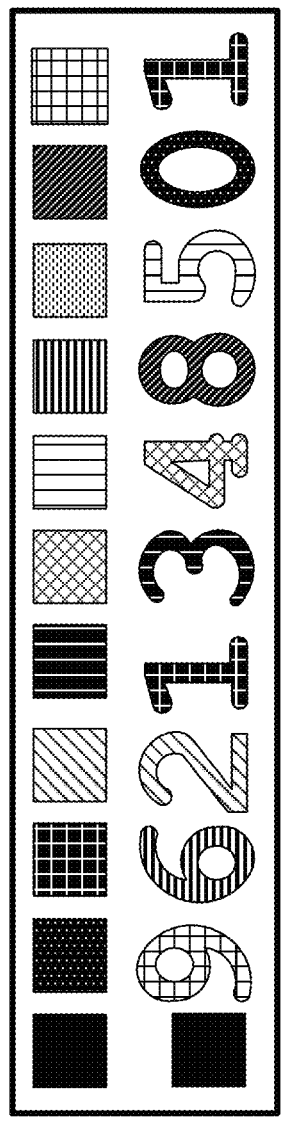
FIGS. 8(a) and 8(b) illustrate example arrangements of structural elements in accordance with an example implementation.
Figure 8B:
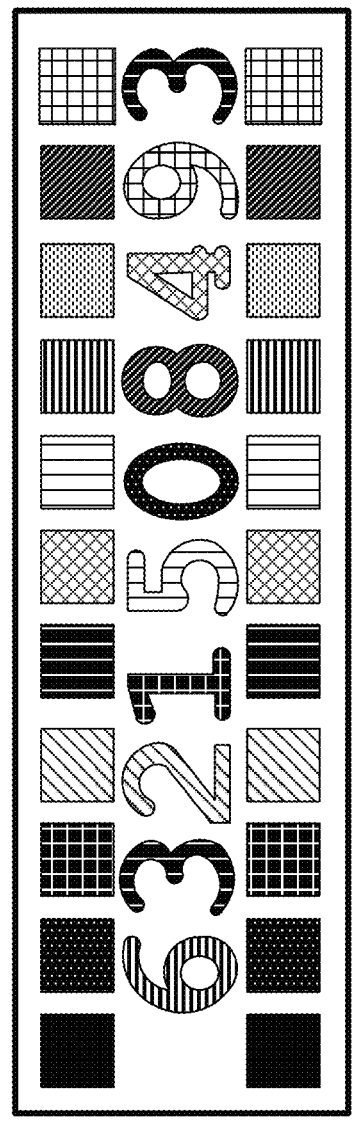

FIGS. 8(*a*) and 8(*b*) illustrate example arrangements of structural elements in accordance with an example implementation. In the example of FIG. 8(*a*), there are two anchors and one self-calibration patterns in accordance with the implementation of FIG. 7. FIG. 8(*b*) illustrates an example involving two anchors and two self-calibration patterns.

Depending on the desired implementation, the color palette/fill pattern is flexible and can be adapted based on the specific use-case and constraints of the operating environment.

Such example constraints can include human readability. If there is a need for human readability of tags and people with color-blindness are to be accommodated, then a reduced and selective color palette with colors that are more inclusive can be used. Another example is the substrate color. If the substrate on which the information is to be printed is dark in color, then a palette with lighter-colors can be used. Conversely, for lighter colored substrates darker shades can be used. Another example can include the availability of inks. Based on the substrate, there may be printing constraints. For instance, the suitable inks may only be available in certain colors. In such a case, the decision of which colors to use for the color-band based tag can be made based on availability of inks. In addition, reflectivity may also need to be considered. For certain use-cases, particularly those involving low-light reading conditions, retro reflectivity may be a desired feature. In such cases, selection of color-palette can be made based on the availability of retroreflective paints and inks.

Figure 9:
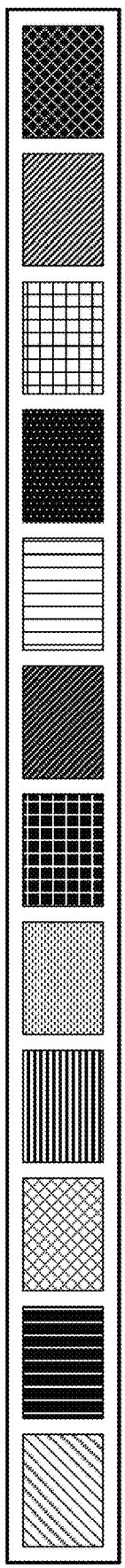
FIG. 9 illustrates an example of a 12-pattern palette with distinct patterns, in accordance with an example implementation.

FIG. 9 illustrates an example of a 12-pattern palette with distinct patterns, in accordance with an example implementation. A subset of patterns can be chosen from it based on the use-case and operating environment. As noted and as depending on the desired implementation, one of ordinary skill in the art can replace the patterns with colors or with other patterns of their choosing to facilitate a 12-color palette for a color tag implementation. Further, one of ordinary skill in the art can modify the example of FIG. 9 to include any number of colors, patterns or color/pattern combinations for any sized palette to facilitate the desired implementation.

Depending on the color/pattern-palette selected, information can be appropriately encoded. For instance, with a 10-color/pattern palette, a decimal representation of information can be used, and each color/pattern can be mapped to a single decimal digit (e.g., $Color_0=0$, $Color_1=1$, . . . , $Color_9=9$). With an 8-color/pattern palette, an octal representation of information can be used, and each color/pattern can be mapped to a single octal digit (e.g., $Color_0=0$, $Color_1=1$, . . . , $Color_7=7$). With a 4-color/pattern palette, a quaternary representation of information can be used, and each color/pattern can be mapped to a single base-4 digit (e.g., $Color_0=0$, $Color_1=1$, $Color_2=2$, $Color_3=3$). With a 2-color palette, a binary representation of information can be used, and each color/pattern can be mapped to a single bit (e.g., $Color_0=0$, $Color_1=1$). Alphanumeric information can also be mapped to a color/pattern-space and encoded to facilitate the desired implementation.

In an example of an OCTG application, roughly ten billion-pipes need to be assigned a unique identity. Based on the number of unique colors available, the number of color/pattern-bars needed to provide unique identity to ten billion pipes will vary. For example, a 10-color/pattern palette would require 10 color/pattern-bars, an eight color/pattern palette requires roughly 12 color/pattern-bars, and a 4-color/pattern palette requires roughly 17 color/pattern-bars, assuming that no error detection or error correction information is additionally encoded.

For serial numbers for OCTG pipes, example implementations can include well-formatted numbers (e.g. <Mill ##><Year><Furnace ##><heat ##><pipe serial ##>), serial number (e.g., just numbers from a series that are allocated to different mills, or universally unique identifiers (UUID) (which are randomly and uniquely generated)), and so on in accordance with the desired implementation.

As described herein, to determine the orientation of the tag and the reading-direction, anchors are included on the HRC tag. In a typical application scenario, the tag may not be always oriented straight with respect to the camera. Anchors on the tag are used to mark the beginning and end of the tag. The reading application can thus detect the anchors first to determine which direction to read the tag. At the very least one anchor is needed, however, more anchors provide redundancy and in the event that an anchor is not visible or is scratches/erased, other anchors can be used. For the OCTG implementation, considering the harsh usage environment, four anchors can be utilized on the tag.

Further, it is not uncommon for tags to be misread due to damage, fading, missing anchors, missing calibration patterns or camera orientation errors. In such cases, a number of different approaches are used to detect and/or correct for errors. At the basic-level, for error detection parity bits or checksums are used.

In an example implementation for a checksum, for a tag that encodes an 11-digit integer serial number, a checksum digit is also included, which when added to the rest of 11 digits, makes the sum of digits divisible by some number (e.g., 9). Thus when reading such a serial number, if the sum of digits is not divisible by the number then there is an error in reading.

FIG. 10 illustrates an example of a checksum scheme, in accordance with an example implementation. The example of FIG. 10 is based on the use-case, and can be modified to involve more complicated checksum approaches and error correction codes for the desired implementation. Error correction and error detection has been made a function of information being encoded as opposed to of the tag directly. By not mandating a particular fixed approach, the tag stays flexible and adaptable. For instance, if a larger color-palette is used and there is no constraint of tag length, then error correction codes that can correct multi-digit errors can be employed. Of course, they will lead to a larger serial number. This flexibility requires customization of the reader application for the use-case. However, since HRC is aimed towards large industrial applications a customized reader is not a constraint.

Figure 11:
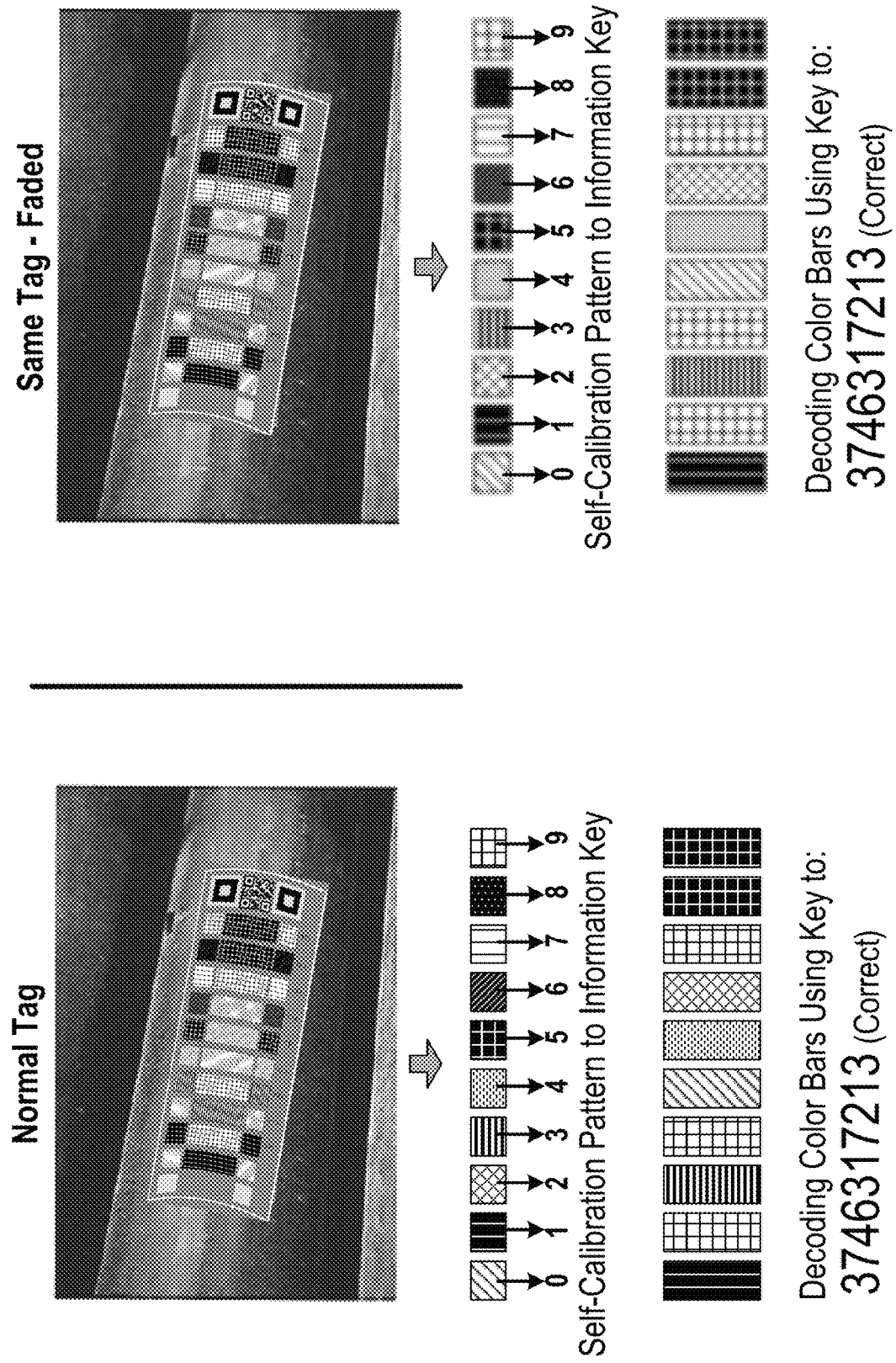
FIG. 11 illustrates an example of auto-calibration that is utilized to read faded tags, in accordance with an example implementation.

FIG. 11 illustrates an example of auto-calibration that is utilized to read faded tags, in accordance with an example implementation. Detecting colors or patterns accurately and consistently is non-trivial. To start with, the printing process itself introduces variance due to differences in printing equipment and setup, and due to differences in inks and paints from different batches and manufacturers. Substrate or background color may further introduce variation in the perception of colors. On the reading side, no two camera sensors are alike. Even sensors from the same manufacturer and same batch may have differences. Furthermore, depending upon the use-case, the state of printed color bands or pattern bands may vary over time. For instance, in the OCTG pipe-tracking use-case, the pipes are stored in outside environment for long-period and are exposed to elements. In such a scenario, colors tend to fade overtime. Such issues of consistency with reading colors have been a major hindrance to adoption of colors in tracking tags.

To address such issues, example implementations involve self-calibration patterns on the tag. These self-calibration patterns represent the color/pattern palette used and information (bit, digit) that each color in the color/pattern-palette indicates. By reading the self-calibration pattern first, a vision-based reading system can calibrate the color-palette for each individual tag. The self-calibration patterns are printed along with the color-bars that represent the information being encoded, using the same inks and the same printing equipment. As the patterns are on the tag, they are largely subjected to the same weathering conditions as the color/pattern-bars and thus have similar fading effects. As the calibration pattern is on the tag itself, nominal variations in camera sensors won't impact reading.

To read HRC tags, example implementations utilize the concept of 3Rs (Recognition, Reorganization and Reconstruction). While recognition primarily defines the primary approach to read the tags, reorganization and reconstruction form the approaches to improve tag accuracy and read damaged tags.

With regards to recognition, example implementations utilized a vision-based reading approach for the tags. Depending upon the tag application, and nature of objects being tracked, several different approaches to read the tags are possible. These could be computer-vision based, or deep-learning based or hybrid approaches.

Figure 12B:
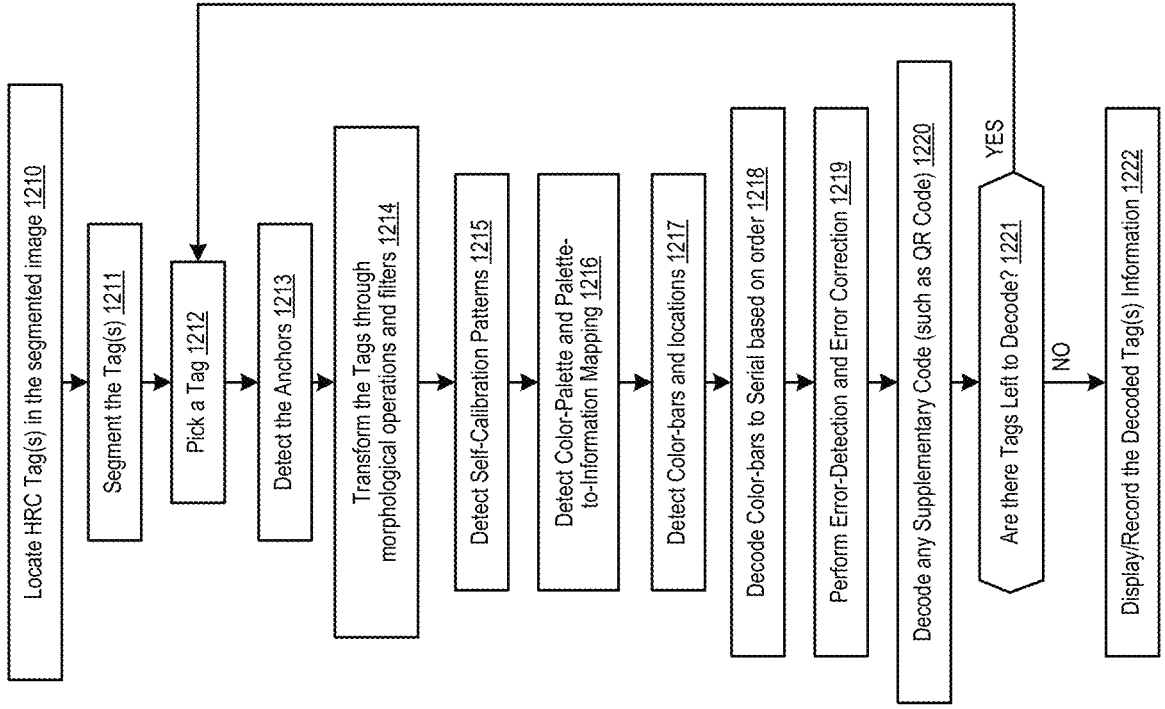
FIGS. 12(a) and 12(b) illustrate example flow diagrams for reading/tracking tags, in accordance with an example implementation.
Figure 12A:
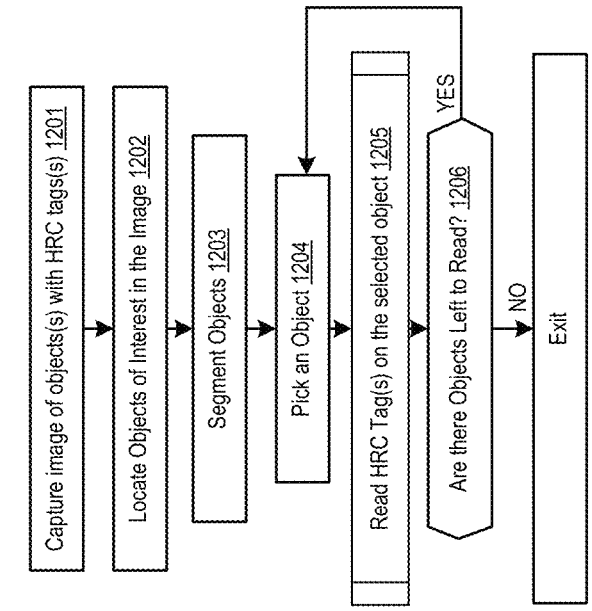

FIGS. 12(a) and 12(b) illustrate example flow diagrams for reading/tracking tags, in accordance with an example implementation. An example implementation of a reading workflow is shown in FIG. 12(a).

At 1201, the process captures an image of the object to be tracked having the HRC tag(s) through using a hand held reader or a fixed camera.

At 1202, the process locates the object(s) of interest in the image. For instance, the image may contain multiple OCTG pipes with multiple tags each. To associate multiple tags with a pipe, each object is extracted individually.

At 1203, the process segments the object(s) in the image and extracts the object segment images.

At 1204, the process initiates a loop for each object segment for 1205 and 1206. For each object segment, the process invokes 1205 to locate and read the HRC tag(s) in the segmented object image. This process invokes the flow of FIG. 12(b) to detect the HRC tags that are visible. At 1206, if there are more tags to process (YES) then the flow proceeds to 1204, otherwise (NO) the process ends.

FIG. 12(b) illustrates the sub-process for reading the HRC tag(s) on the selected object. At 1210, for the segmented images, the boundaries of the tags are detected and tags are extracted through a segmentation process of 1211. At 1212, each tag is processed in a loop as follows.

At 1213, the anchors are detected to detect the orientation of the tags. At 1214, the tag is transformed using morphological operations: based on the anchor locations the tag is transformed to a standard right-side-up view. Additionally, filters such as those for antialiasing, speckle-noise removal, pixel intensity normalization etc. can be applied in accordance with the desired implementation.

At 1215, self-calibration patterns are detected. The detection of self-calibration patterns provides information about the size of the color/pattern-palette.

At 1216, the process decodes color/pattern-palette and palette to information mapping. The color/pattern-palette is decoded on a per-tag basis and mapping of each color/pattern to an information bit is established. The specific color values in the decoded color/pattern-palette can help calibrate the camera for each individual tag.

At 1217, the process detects color-bars and locations, which include the actual color/pattern-bars containing the information to be decoded and their relative locations.

At 1218, the process decodes color/pattern-bars and transforms to information. The color-bars are decoded by using the color/pattern-palette derived from the self-calibration patterns and by using the mapping of colors/patterns to information.

At 1219, the process performs error detection and/or error correction as needed. The decoded serial numbers are checked for errors. If an error is detected the user is informed of an incorrect read. In case, the tag included error correction information, the incorrectly read information is corrected.

At 1220 the process parses supplementary codes. If the tag includes a supplementary code (such as QR code), the code is decoded. If the HRC tag includes a supplementary code such as a QR code or a Datamatrix code, it is decoded next to provide more information. At 1221, a determination is made as to whether there are any additional tags to process. If so (YES), then the flow proceeds back to 1212 to process the next tag, otherwise (NO) the process proceeds to 1222 to display/record the information of the decoded tag(s).

HRC can be utilized on industrial use-cases. The tag can be customized and the reading process can be adapted for specific use-cases and associated constraints of the specific implementation scenario. In most industrial cases, at any given point in time and at any given tracking location only a subset of the serial numbers or codes may be used. For instance, a 10-digit decimal serial number format allows for 10 billion keys (excluding parity information). However, at any given point in time only a few million serial numbers may be considered in active use (others may have been used too far in the past or may be used in future). Of these, based on any given tracking location/division and subgroup (geographic region, SKU type, factory/manufacturer etc.), only a few thousand may be relevant. In such cases, the problem of decoding a serial number in general can be simplified to finding a serial number in a much smaller (relevant) subset. In the 10-digit serial number use-case, if a million serials are active globally and 10 thousand are relevant locally, then the problem of decoding 10 digits correctly gets simplified to decoding enough digits successfully to recognize the serial in the locally relevant subset or at worst in the globally active subset. This allows for substantial improvement in reading accuracy. If all serial numbers are randomly allocated (such as UUIDs), then the approach can work even better although at the expense for more table lookups.

Figure 13:
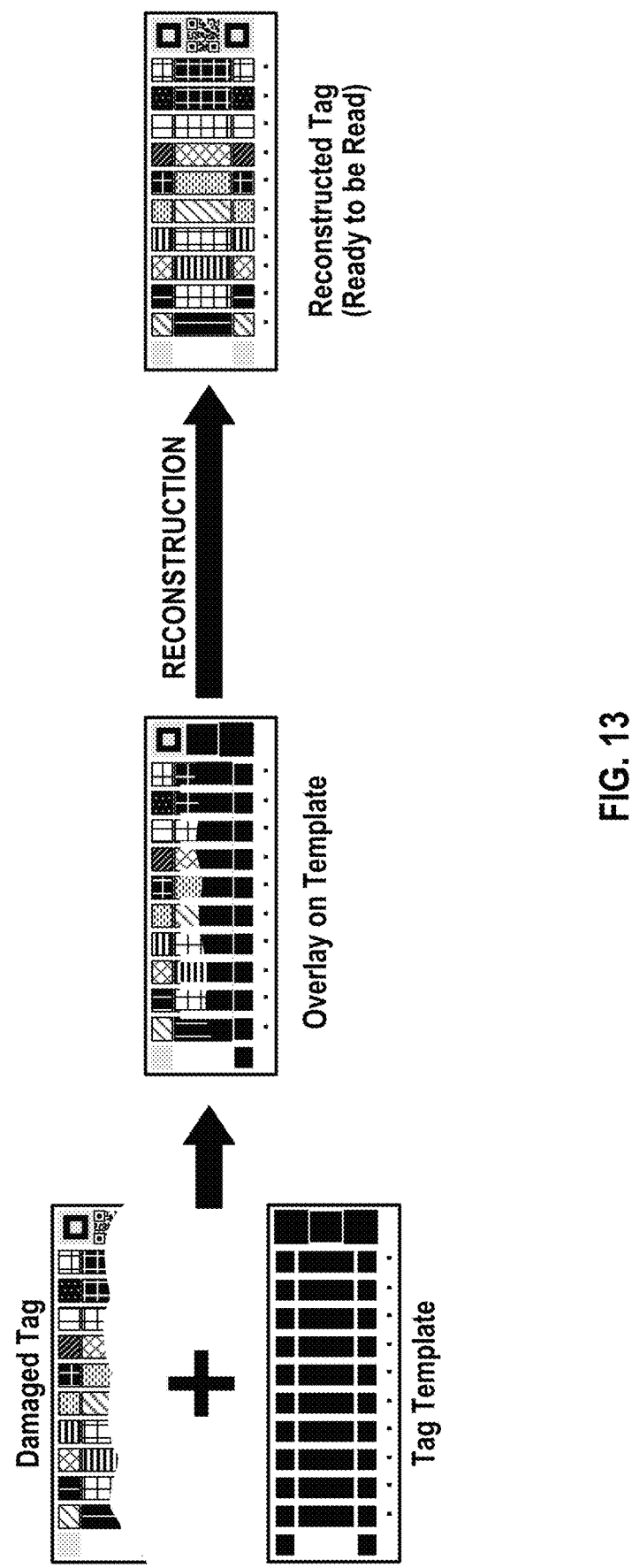
FIG. 13 illustrates an example process to reconstruct a damaged tag, in accordance with an example implementation.

FIG. 13 illustrates an example process to reconstruct a damaged tag, in accordance with an example implementation. In the industrial use-cases, it is quite common for the tags to get damaged for reasons such as scratches, corrosion, fading, and so on. HRC tags have been created with a high level of redundancy to address such scenarios. The serial number or information encoded on the tag can itself include some element of error correction.

Apart from that the tag can have multiple redundant anchors, multiple redundant calibration patterns, and thick bars. As the tag structure is known, if the tag is partially damaged then missing aspects can be reconstructed using the redundant information, by filling the standard tag template, thereby enabling the tag to be read.

Figure 14:
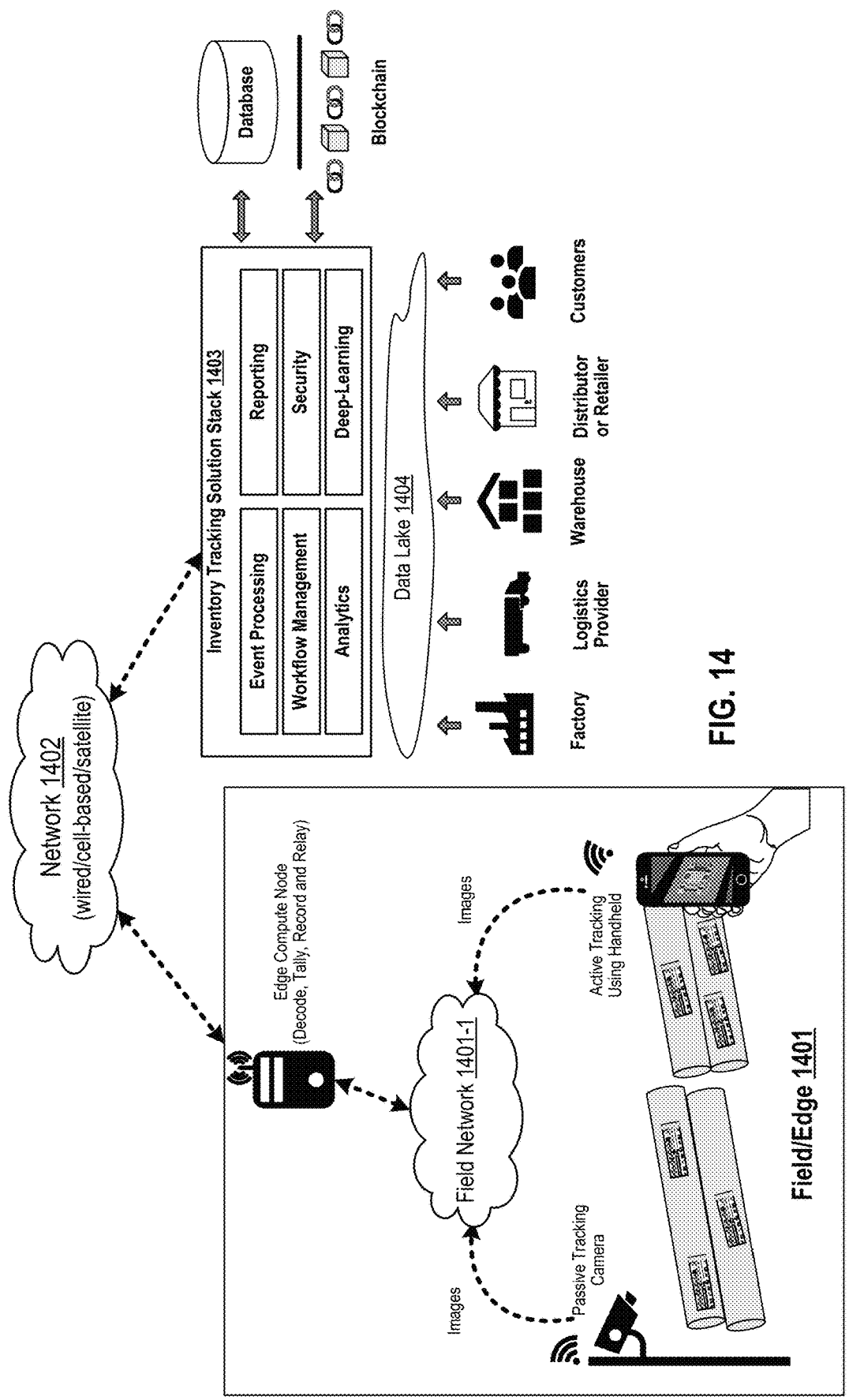
FIG. 14 illustrates an example deployment of the system, in accordance with an example implementation.

FIG. 14 illustrates an example deployment of the system, in accordance with an example implementation. Within the field/edge site 1401 there might be active reading of tags (such as using handheld tag readers) or passive reading (such as using distant fixed camera infrastructure). The reading devices may have in-built tag-reading logic or they may send the captured images to an edge compute node via a field/local network 1401-1. The edge compute node may decode the tag and send the decoded information back to the device (particularly in case of a hand held reader). The edge compute node may also tally the information locally, record it and can also relay it to be back-office or operations center via a network 1402.

The back-office or operations center can include an inventory tracking solution stack 1403 which is an apparatus configured to maintain databases or blockchains of all active and historical tag codes. Such codes and associated metadata may be uploaded by the factories and may be added to or appended to by various entities in the supply chain such as warehouse providers, logistics providers, distributors, retailers and end customers through a data lake 1404. The back-office/operations center may run the inventory tracking solution stack 1403 with various programmed functions, which can include, but are not limited to, analysis (e.g., data analytics), deep-learning capabilities, workflow management, security management, event processing, and reporting. The tracking solution stack 1403 may also have components to orchestrate the workflows.

The example implementations described herein thereby facilitate a linear, high-redundancy, color/pattern-fill bar-code. The primary advantages can include facilitating an integrated, but customizable tag that can be adapted for the specific industrial use-case, while providing redundancies at multiple levels from the serial number or identifier itself, to bar-level, and to potentially at the tag level. Example implementations of the tag can be partnered with devices that can read the tag from a distance as well as facilitate bulk reading capability while providing improved information density over monochrome 1D bar-codes through the use of color or patterns.

In example implementations, the simpler linear application of tag over curved surfaces (as opposed to fine-grained 2D tags) allow for the application of such tags on curved surfaces such as OCTG pipes without loss of readability, and can further be made accessible to color-blind people.

The example implementations described herein are provided with the examples of OCTG and tubular tracking. However, the example implementations described herein can also be used for other track and trace applications including, but not limited to, packages and pallets in warehouses, parts tracking, as well as rolling stock and railways.

Figure 15:
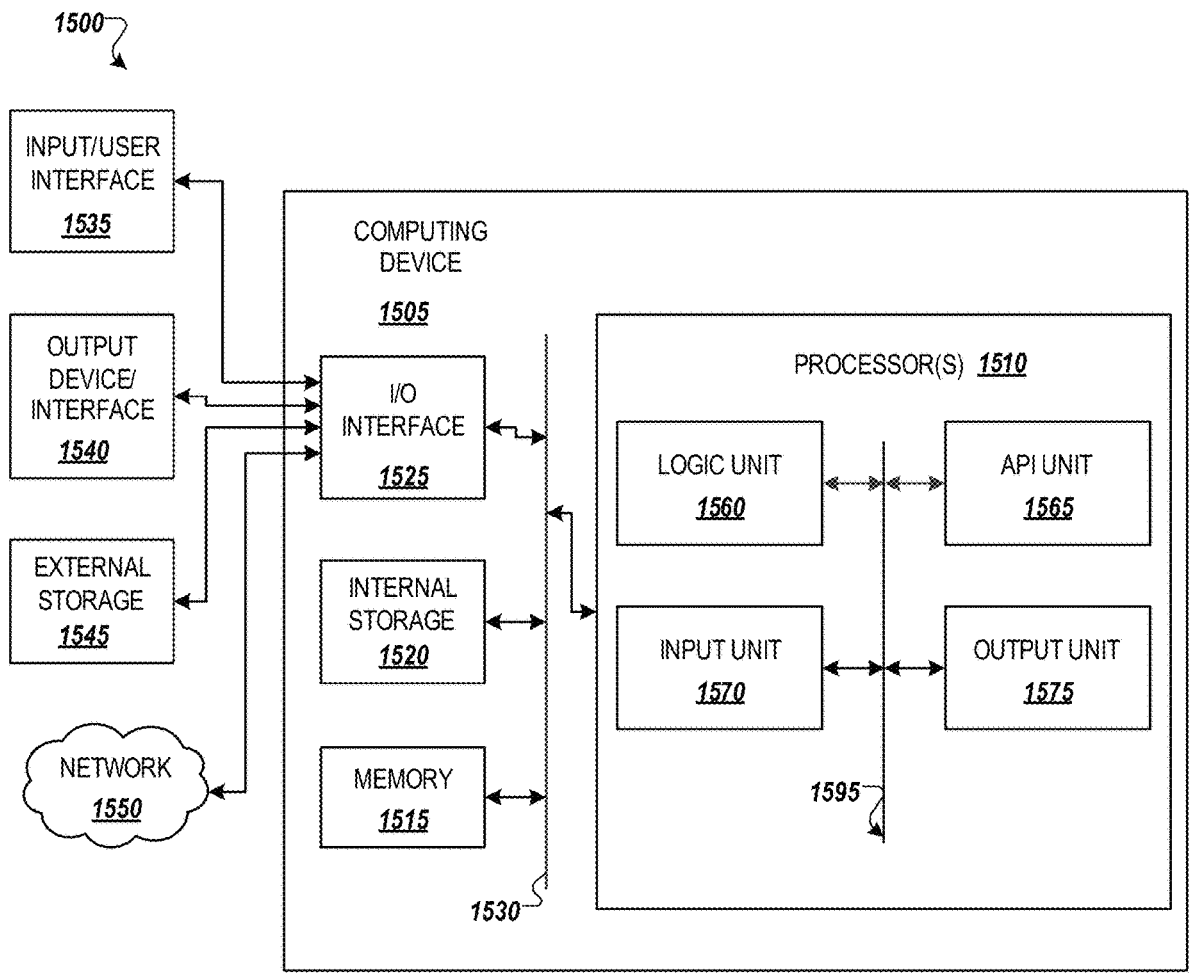
FIG. 15 illustrates an example computing environment with an example computer device suitable for use in some example implementations.

FIG. 15 illustrates an example computing environment with an example computer device suitable for use in some example implementations, such as an edge compute node configured to communicate with a passive tracking or active tracking device as illustrated in FIGS. 2 and 14, and or an inventory tracking solution stack 1403 as illustrated in FIG. 14. Computer device 1505 in computing environment 1500 can include one or more processing units, cores, or processors 1510, memory 1515 (e.g., RAM, ROM, and/or the like), internal storage 1520 (e.g., magnetic, optical, solid state storage, and/or organic), and/or I/O interface 1525, any of which can be coupled on a communication mechanism or bus 1530 for communicating information or embedded in the computer device 1505. I/O interface 1525 is also configured to receive images from cameras or provide images to projectors or displays, depending on the desired implementation.

Computer device 1505 can be communicatively coupled to input/user interface 1535 and output device/interface 1540. Either one or both of input/user interface 1535 and output device/interface 1540 can be a wired or wireless interface and can be detachable. Input/user interface 1535 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1540 may include a display, television, monitor, printer, speaker, braille, or the like. In some example implementations, input/user interface 1535 and output device/interface 1540 can be embedded with or physically coupled to the computer device 1505. In other example implementations, other computer devices may function as or provide the functions of input/user interface 1535 and output device/interface 1540 for a computer device 1505.

Examples of computer device 1505 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1505 can be communicatively coupled (e.g., via I/O interface 1525) to external storage 1545 and network 1550 for communicating with any number of networked components, devices, and systems, including one or more computer devices of the same or different configuration. Computer device 1505 or any connected computer device can be functioning as, providing services of, or referred to as a server, client, thin server, general machine, special-purpose machine, or another label.

I/O interface 1525 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1500. Network 1550 can be any network or combination of networks (e.g., the Internet, local area network, wide area network, a telephonic network, a cellular network, satellite network, and the like).

Computer device 1505 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1505 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1510 can execute under any operating system (OS) (not shown), in a native or virtual environment. One or more applications can be deployed that include logic unit 1560, application programming interface (API) unit 1565, input unit 1570, output unit 1575, and inter-unit communication mechanism 1595 for the different units to communicate with each other, with the OS, and with other applications (not shown). The described units and elements can be varied in design, function, configuration, or implementation and are not limited to the descriptions provided. Processor(s) 1510 can be in the form of hardware processors such as central processing units (CPUs) or in a combination of hardware and software processors.

In some example implementations, when information or an execution instruction is received by API unit 1565, it may be communicated to one or more other units (e.g., logic unit 1560, input unit 1570, output unit 1575). In some instances, logic unit 1560 may be configured to control the information flow among the units and direct the services provided by API unit 1565, input unit 1570, output unit 1575, in some example implementations described above. For example, the flow of one or more processes or implementations may be controlled by logic unit 1560 alone or in conjunction with API unit 1565. The input unit 1570 may be configured to obtain input for the calculations described in the example implementations, and the output unit 1575 may be configured to provide output based on the calculations described in example implementations.

Processor(s) 1510 can be configured to locate, from an image of an object, a tag on the object as illustrated at FIGS. 12(*a*) and 1210 of FIG. 12(*b*), the tag involving one or more anchors indicative of an orientation of the tag as illustrated from FIGS. 3 to 8(*b*), a calibration pattern mapping each of a plurality of colors to one or more values as illustrated on FIGS. 3 to 9, and encoded information provided on the tag in one or more of the plurality of colors as illustrated in FIGS. 3 to 9; transforming the tag according to the orientation indicated by the one or more anchors; determining a color palette to information mapping from the calibration pattern based on the mapping of the plurality of colors to the one or more values; and decoding the encoded information from the one or more of the plurality of colors based on the color palette to information mapping as illustrated in FIG. 12(*b*). Depending on the desired implementation, the object can be a curved object such as an OCTG pipe as illustrated in FIGS. 1 and 2.

As illustrated in FIGS. 3 to 9, the tag can further involve one or more supplemental codes, wherein the processor(s) 1510 are configured to decode the one or more supplemental codes.

Depending on the desired implementation, the encoded information can be in the form of a plurality of bars, each of the plurality of bars colored with a color from the one or more of the plurality of colors as illustrated in FIGS. 3 and 4. The encoded information can also be in the form of a plurality of characters, each of the plurality of letters colored with a color from the one or more of the plurality of colors as illustrated in FIGS. 5 to 6(*b*), and/or in the form of numbers with each of the plurality of numbers colored with a color from the one or more of the plurality of colors as illustrated in FIGS. 7 to 8(*b*).

Depending on the desired implementation, the encoded information can include checksum information encoded in one of the plurality of colors, wherein the processor(s) 1510 are configured to conduct error detection or error correction from decoding the checksum information from the color palette to information mapping as illustrated in FIG. 10.

Processor(s) 1510 can be configured to, for detection of the tag being damaged (e.g., incomplete, broken, etc.), reconstruct the tag based on a tag template as illustrated in FIG. 14.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
    locating, from an image of an object, a tag on the object, the tag comprising one or more anchors indicative of an orientation of the tag, a calibration pattern comprising a plurality of elements, each of the plurality of elements representative of a color mapped to one or more values, and encoded information provided on the tag in one or more of the plurality of colors;
    transforming the tag according to the orientation indicated by the one or more anchors;
    determining a color palette to information mapping from the plurality of elements of the calibration pattern, the color palette to information indicative mapping the color of each element of the plurality of elements of the calibration pattern to the one or more values; and
    decoding the encoded information from the one or more of the plurality of colors based on the color palette to information mapping.

2. The method of claim 1, wherein the object is a curved object.

3. The method of claim 1, the tag further comprising one or more supplemental codes, wherein the method further comprises decoding the one or more supplemental codes.

4. The method of claim 1, wherein the encoded information comprises a plurality of bars, each of the plurality of bars colored with a color from the one or more of the plurality of colors.

5. The method of claim 1, wherein the encoded information comprises a plurality of characters, each of the plurality of letters colored with a color from the one or more of the plurality of colors.

6. The method of claim 5, wherein the each of the plurality of letters colored with a color from the one or more of the plurality of colors is physically provided on the tag.

7. The method of claim 1, wherein the encoded information comprises a plurality of numbers, each of the plurality of numbers colored with a color from the one or more of the plurality of colors.

8. The method of claim 7, wherein the each of the plurality of numbers colored with a color from the one or more of the plurality of colors is physically provided on the tag.

9. The method of claim 1, wherein the encoded information comprises checksum information encoded in one of the plurality of colors, wherein the method further comprises conducting error detection or error correction from decoding the checksum information from the color palette to information mapping.

10. The method of claim 1, the method further comprising:
    for detection of the tag being damaged, reconstructing the tag based on a tag template.

11. The method of claim 10, wherein the reconstructing the tag based on the tag template comprises reconstructing original physical characteristics of the tag.

12. A tag, comprising:
one or more anchors indicative of an orientation of the tag;
a calibration pattern comprising a plurality of elements, each of the plurality of elements representative of a color mapped to one or more values; and
encoded information provided on the tag in one or more of the plurality of colors.

13. A method for providing a tag, comprising:
printing a tag on a surface of a curved object, the tag comprising one or more anchors indicative of an orientation of the tag, a calibration pattern comprising a plurality of elements, each of the plurality of elements representative of a color mapped to one or more values; and encoded information provided on the tag in one or more of the plurality of colors.

\* \* \* \* \*